United States Patent
Yun

(10) Patent No.: US 9,621,891 B2
(45) Date of Patent: Apr. 11, 2017

(54) APPARATUS FOR TRANSMITTING IMAGE DATA

(71) Applicant: LG INNOTEK CO., LTD., Seoul (KR)

(72) Inventor: Ji Hyun Yun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 542 days.

(21) Appl. No.: 14/348,698

(22) PCT Filed: Sep. 26, 2012

(86) PCT No.: PCT/KR2012/007745
§ 371 (c)(1),
(2) Date: Mar. 31, 2014

(87) PCT Pub. No.: WO2013/048105
PCT Pub. Date: Apr. 4, 2013

(65) Prior Publication Data
US 2014/0286439 A1    Sep. 25, 2014

(30) Foreign Application Priority Data

Sep. 30, 2011 (KR) ........................ 10-2011-0099854

(51) Int. Cl.
*H04N 19/88* (2014.01)
*H04N 13/00* (2006.01)
*H04N 19/597* (2014.01)

(52) U.S. Cl.
CPC ... *H04N 19/00927* (2013.01); *H04N 13/0059* (2013.01); *H04N 19/597* (2014.11); *H04N 19/88* (2014.11); *H04N 2213/003* (2013.01)

(58) Field of Classification Search
CPC ....... H04N 19/00927; H04N 19/00928; H04N 19/012; H04N 60/23; G06Q 30/0633
(Continued)

(56) References Cited

U.S. PATENT DOCUMENTS

2002/0057795 A1*  5/2002  Spurgat ................. H04H 60/23
                                                                           380/1
2002/0116277 A1*  8/2002  Kraft ................... G06Q 30/0633
                                                                          705/26.8
(Continued)

FOREIGN PATENT DOCUMENTS

KR    10-2011-0027231 A    3/2011
KR    10-2011-0032048 A    3/2011
(Continued)

OTHER PUBLICATIONS

International Search Report in International Application No. PCT/KR2012/007745, filed Sep. 26, 2012.
(Continued)

*Primary Examiner* — Tung Vo
(74) *Attorney, Agent, or Firm* — Saliwanchik, Lloyd & Eisenschenk

(57) ABSTRACT

An image data transmitting apparatus is disclosed, the apparatus being configured to receive a right image and a left image and transmit the received right image and left image to a host system using a USB method, such that a depth image and a color image can be compressed in real time by a standard protocol, the compressed depth image and the color image are respectively converted to USB packet data, and the converted depth image and the color image are transmitted to a host system.

12 Claims, 1 Drawing Sheet

(58) Field of Classification Search
 USPC .................................................. 375/240.26
 See application file for complete search history.

(56) References Cited

U.S. PATENT DOCUMENTS

| | | | | |
|---|---|---|---|---|
| 2002/0174243 A1* | 11/2002 | Spurgat | ................. | H04H 60/88 |
| | | | | 709/231 |
| 2003/0043278 A1* | 3/2003 | Ushiro | ............... | H04N 5/23209 |
| | | | | 348/207.99 |
| 2009/0178097 A1* | 7/2009 | Kim | ......................... | G06F 3/14 |
| | | | | 725/114 |
| 2011/0310230 A1* | 12/2011 | Cheng | ............... | H04N 13/0217 |
| | | | | 348/49 |
| 2012/0176471 A1* | 7/2012 | Cheng | ............... | H04N 13/0264 |
| | | | | 348/43 |

FOREIGN PATENT DOCUMENTS

| | | |
|---|---|---|
| KR | 10-2011-0055820 A | 5/2011 |
| KR | 10-2011-0071483 A | 6/2011 |
| TW | 200822704 A | 5/2008 |
| TW | 201003564 A1 | 1/2010 |
| TW | M391130 U1 | 10/2010 |
| TW | M395321 U1 | 12/2010 |
| TW | 201112161 A1 | 4/2011 |

OTHER PUBLICATIONS

Office Action dated Nov. 29, 2016 in Taiwanese Application No. 101135921.

* cited by examiner

APPARATUS FOR TRANSMITTING IMAGE DATA

CROSS-REFERENCE TO RELATED APPLICATIONS

This application is the U.S. national stage application of International Patent Application No. PCT/KR2012/007745, filed Sep. 26, 2012, which claims priority to Korean Application No. 10-2011-0099854, filed Sep. 30, 2011, the disclosures of each of which are incorporated herein by reference in their entirety.

TECHNICAL FIELD

The teachings in accordance with exemplary embodiments of this invention relate generally to an apparatus for transmitting image data (hereinafter referred to as "image data transmission apparatus", or simply "apparatus").

BACKGROUND ART

Generally, a camera system outputting a depth image using a stereo camera transmits two image data of depth image and color image to a host system. FIG. 1 is a configurative block diagram illustrating an image data transmitting apparatus according to prior art.

Referring to FIG. 1, a conventional image data transmitting apparatus (100) is configured such that a right image of M×N and a left image of M×N are image-processed by an image processor (110) to output a depth image of M×N and a color image of M×N, where frame size and synchronization of the depth image and color image are corrected by an interface (120), which is simultaneously outputted to a host system (200) such as a television or a computer (PC).

In the conventional image data transmitting apparatus (100), when the interface unit (120) transmits an image to the host system (200), the image is transmitted to the host system (200) directly, or via IEED1394, CAMLINK, HDMI (High-Definition Multimedia Interface) or USB (Universal Serial Bus). The CAMLINK or HDMI is limited in use due to high price, such that an USB type interface is generally used except for handheld devices. Currently, USB 2.0 type is used.

However, the USB-type interface unit (120) suffers from a disadvantage in that frame size is restricted due to bandwidth limitation (480 Mbps) in transmitting a depth image and a color image. Furthermore, the USB-type interface unit (120) suffers from a disadvantage in that the host system (200) tends to be complicated, because one endpoint is used for transmitting an image data (see FIG. 1), a non-standard encoder (not shown) is required for transmitting two image data through one transmission path, and the host system (200) requires a non-standard decoder (not shown) for decoding the coded image data.

Meanwhile, the host system (200) also suffers from disadvantages in that it must be mounted with separate non-standard driver software for recognizing devices and a separate non-standard API (Application Programming Interface) to go with the separate non-standard driver software.

DISCLOSURE OF INVENTION

Technical Problem

Accordingly, an exemplary embodiments of the present invention may relate to an image data transmission apparatus that substantially obviates one or more of the above disadvantages/problems due to limitations and disadvantages of related art, and it is an object of an exemplary embodiment of the present invention to provide an apparatus for transmitting image data (image data transmission apparatus, or simply apparatus) configured to perform, by an interface unit, a standard image compression encoding, to increase a data transmission efficiency, and to cope with bandwidth limitation of USB type.

It is another object of an exemplary embodiment of the present invention to provide an image data transmission apparatus configured to use two endpoints of USB interface unit to transmit two images (depth image and color image) to a host system via each endpoint, whereby separate encoding and decoding are not required.

It is another object of an exemplary embodiment of the present invention to provide an image data transmission apparatus configured to support a USB video class to dispense with a separate device driver, where a host system processes an image in response to an API relative to the USB video class to dispense with an additional API.

Technical problems to be solved by the present invention are not restricted to the above-mentioned description, and any other technical problems not mentioned so far will be clearly appreciated from the following description by skilled in the art.

Solution to Problem

In order to accomplish the above objects, in one general aspect of an exemplary embodiment the present disclosure, there may be provided an image data transmission apparatus, the apparatus comprising: a compression unit performing compression on the depth image data and the color image data in real time using a predetermined standard protocol; a conversion unit converting the compressed depth image data and the color image data to USB packet data respectively; and a transmission unit transmitting the converted depth image data and the color image data to a host system via USB.

In an exemplary embodiment of the present disclosure, the standard protocol used by the compression unit may include JPEG or H.242.

In an exemplary embodiment of the present disclosure, the host system may decompress the received depth image data and the color image data, using the standard protocol used by the compression unit.

In an exemplary embodiment of the present disclosure, the transmission unit may transmit the converted depth image data and the color image data by allocating to mutually different endpoints.

In an exemplary embodiment of the present disclosure, the host system may selectively or simultaneously use the received depth image data and the color image data.

In an exemplary embodiment of the present disclosure, the transmission unit may transmit the depth image data and the color image data using a universal transport protocol.

In an exemplary embodiment of the present disclosure, the universal transport protocol may include a UVC (Universal Video Class).

In an exemplary embodiment of the present disclosure, the host system may further comprise a UVC driver.

In an exemplary embodiment of the present disclosure, the apparatus may further comprise an image processor outputting the depth image data and the color image data from a right image and left image in a stereo type.

In an exemplary embodiment of the present disclosure, the image processor may comprise a stereo matching unit determining an image distance by receiving the right image and the left image, and a line buffer outputting the color image data from the right image and the left image, and outputting the depth image data from an output of the stereo matching unit.

In another general aspect of an exemplary embodiment of the present invention, there may be provided an image data transmission apparatus configured to receive a right image and a left image and transmit the received right image and left image to a host system using a USB type, the apparatus comprising: an image processor determining a depth image data and a color image data using a right image and a left image; and a USB interface unit compressing the depth image data and the color image data in real time using a standard protocol, and transmitting the compressed depth image data and the color image data respectively to a host system via USB.

In an exemplary embodiment of the present disclosure, the USB interface unit may comprise a compression unit performing compression on the depth image data and the color image data in real time using a standard protocol; a conversion unit converting the compressed depth image data and the color image data to USB packet data respectively; and a transmission unit transmitting the converted depth image data and the color image data.

In an exemplary embodiment of the present disclosure, the transmission unit may transmit the converted depth image data and the color image data by allocating to mutually different endpoints.

In an exemplary embodiment of the present disclosure, the transmission unit may transmit the depth image data and the color image data using a universal transport protocol.

In an exemplary embodiment of the present disclosure, the universal transport protocol may include a UVC.

Advantageous Effects of Invention

One advantageous effect is that a standard type such as JPEG or H.264 is used to perform a standard image compression to increase transmission efficiency and to overcome a bandwidth limitation of USB type.

Another advantageous effect is that two endpoints of USB interface unit are used to transmit two images (depth image and color image) to a host system via each endpoint, whereby separate encoding and decoding are not required to simplify the system.

Still another advantageous effect is that a standard UVC is used to transmit image data, whereby the host system needs no separate device driver, and the host system processes the image data in response to API relative to the UVC, whereby additional API is not required to simplify the system.

Still further advantageous effect is that a camera can be easily used free from installation of additional software.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
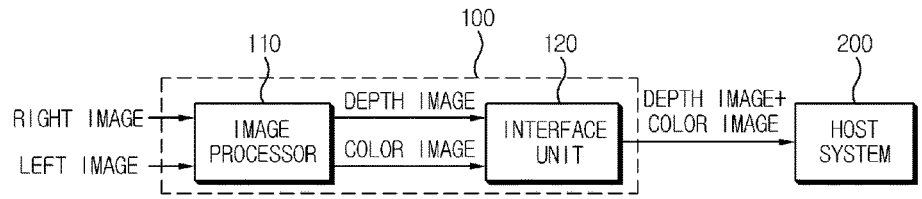
FIG. 1 is a configurative block diagram illustrating an image data transmitting apparatus according to prior art.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the image data transmitting apparatus according to exemplary embodiments of the present invention will be described in detail with reference to the accompanying drawings.

Figure 2:
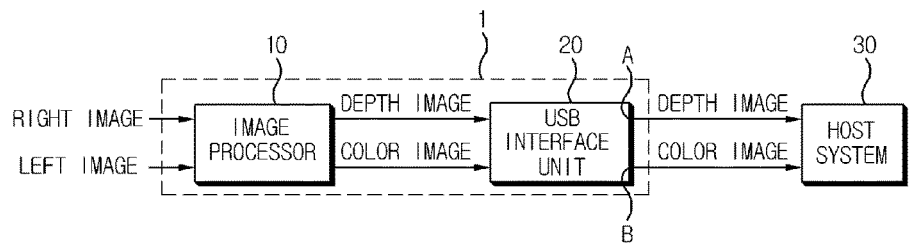
FIG. 2 is a configurative block diagram illustrating an image data transmitting apparatus according to an exemplary embodiment of the present invention.

FIG. 2 is a configurative block diagram illustrating an image data transmitting apparatus according to an exemplary embodiment of the present invention.

Referring to FIG. 2, an image data transmitting apparatus (1) according to an exemplary embodiment of the present invention comprises an image processor (10) and a USB (Universal Serial Bus) interface unit (20), where an output of the USB interface unit (20) is transmitted to a host system (30).

The image processor (10) having received stereo type image of a right image of pixels of M×N and a left image of pixels of M×N outputs a depth image of pixels of M'×N' and a color image of pixels of M×N. The USB interface unit (20) performs an image compression encoding of the inputted depth image and color image in a standard protocol, allocates mutually different endpoints (A, B) to the two images, and transmits the images to the host system (30) via the endpoints. The transmission of the image data is compliant with the UVC (USB Video Class).

The host system (30) is equipped with a UVC driver, and receives two image data from the image data transmission apparatus (1) according to an exemplary embodiment of the present invention, which allows two video devices to be recognized. A user can selectively use one image or two images as necessary, and no additional APIs are required by the host system (30). Hereinafter, the image data transmission device (1) will be described in more detail with reference to the accompanying drawings.

Figure 3:
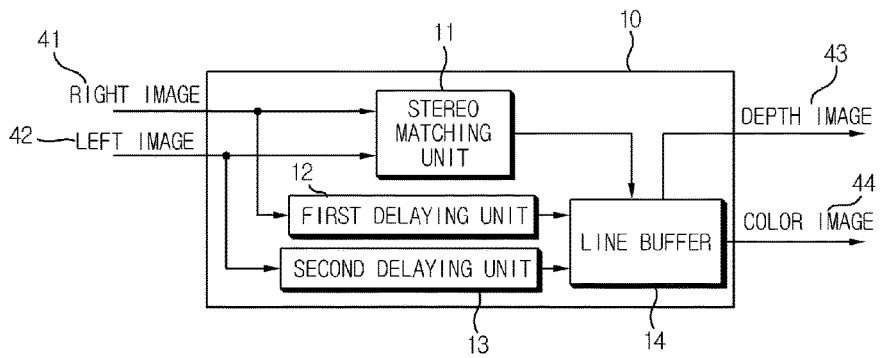
FIG. 3 is a configurative block diagram illustrating an image processor of FIG. 2 according to an exemplary embodiment of the present invention.

FIG. 3 is a configurative block diagram illustrating an image processor of FIG. 2 according to an exemplary embodiment of the present invention.

Referring to FIG. 3, the image processor (10) in the image data transmitting apparatus (1) according to an exemplary embodiment of the present invention comprises a stereo matching unit (11), delaying units (12, 13) and a line buffer (14).

The stereo matching unit (11) receives a right image of M×N (41) and a left image of M×N (42) from cameras (not shown) to determine a distance to an image captured by the cameras. Algorithms used for determining the distance by the stereo matching unit (11) includes dynamic programming and SAD (Sum of Absolute Difference). The algorithms used by the stereo matching unit (11) according to an exemplary embodiment of the present invention are not limited thereto, and the distance to the image can be determined by various types of algorithms.

A depth image (43) determined by the stereo matching unit (11) is outputted by passing through the line buffer (14), and the right image (41) and the left image (42) are respectively delayed for a predetermined time ($\Delta t$) by the delaying units (12, 13) to be outputted in color images via the line buffer (14).

The depth image (43) outputted by the image processor (10) according to an exemplary embodiment of the present invention may be M'×N' in size, and configured in a plurality of frames. For example, the depth image (43) may be an image data whose bit number per pixel is 8 bits. Furthermore, the color image (44) outputted by the image processor (10) according to an exemplary embodiment of the present invention may be M×N in size, and configured in a plurality of frames. For example, the color image (44) may be an image data whose bit number per pixel is 16 bits.

The image size may be changed in response to a processing speed of the image processor (10) according to an exemplary embodiment of the present invention. For example, the image size appropriate for the system may be minimally 640×480 pixels, and as the image size increases, quality of product can be enhanced. In case of size of the image being 640×480 pixels, a minimum data amount can be expressed by the following table:

TABLE 1

| | Resolution (pixels) | Bit per pixel | Frame rate | bandwidth |
|---|---|---|---|---|
| Depth image | 307,200(640 × 480) | 8 bits | 30 fps | 9.2 Mbyte/sec |
| Color image | 307,200(640 × 480) | 16 bits | 30 fps | 18.4 Mbyte/sec |

That is, a data amount actually transmitted for transmitting an image size of 640×480 pixels is minimally 27.6 Mbyte/sec, such that data compression is required for transmitting an image data to the host system (30) through the USB interface unit (20) according to an exemplary embodiment of the present invention.

Mode for the Invention

Figure 4:
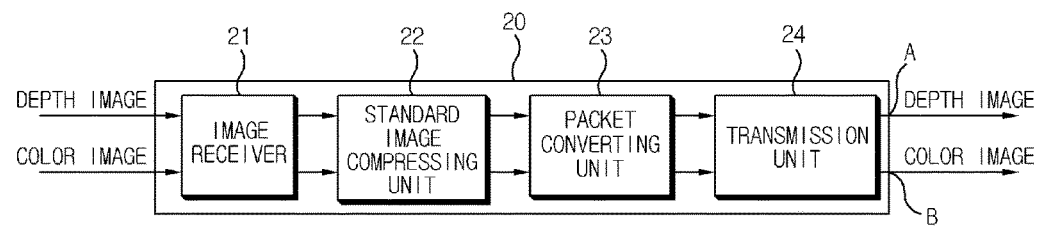
FIG. 4 is a detailed configurative block diagram illustrating a USB interface unit of FIG. 2 according to an exemplary embodiment of the present invention.

FIG. 4 is a detailed configurative block diagram illustrating a USB interface unit of FIG. 2 according to an exemplary embodiment of the present invention, where the USB interface unit (20) according to an exemplary embodiment of the present invention may be configured with one IC (Integrated Circuit).

Referring to FIG. 4, the USB interface unit (20) according to an exemplary embodiment of the present invention comprises an image receiving unit (21), a standard image compression unit (22), a packet conversion unit (23) and a transmitting unit (24).

The image receiving unit (21) receives a depth image and a color image from the image processor (10). The standard image compression unit (22) performs real-time image data compression, and performs an individual compression on the respective images (depth image and color image) using the standard protocols of JPEG (Joint Photographic Experts Group) or H.264. The JPEG and H.264 are video compression standards. It should be apparent to the skilled in the art that the JPEG and H.264 are video compression standards that are well known, such that no more detailed explanation thereto will be omitted. However, the video compression standards that are used by the standard image compression unit (22) according to an exemplary embodiment of the present invention are not limited to the JPEG and H.264, and therefore, it should be apparent to the skilled in the art that use of newly established standard protocols are not ruled out.

The packet conversion unit (23) converts the compressed image data to USB packet data individually to each image data for transmitting the image data compressed by the standard image compressing unit (22).

The transmitting unit (24) transmits the USB packet data to the host system (30). The transmitting unit (24) transmits the USB packet data of two images by allocating to mutually different USB endpoints (A, B), whereby the host system (30) can effectively separate two images (depth image and color image).

Meanwhile, although the conventional interface unit as shown in FIG. 1 has transmitted image data to the host system (30) using non-standard data protocol, the transmitting unit (24) according to an exemplary embodiment of the present invention can use the universal image data transmission protocols. For example, the universal image data transmission protocols defined by the Window system or Linux system can be utilized. A representative example is the UVC. As noted from the above description, the USB interface unit (20) according to an exemplary embodiment of the present invention uses the universal protocols to allow dispensing with a separate USB device to be used by the host system (30).

Figure 5:
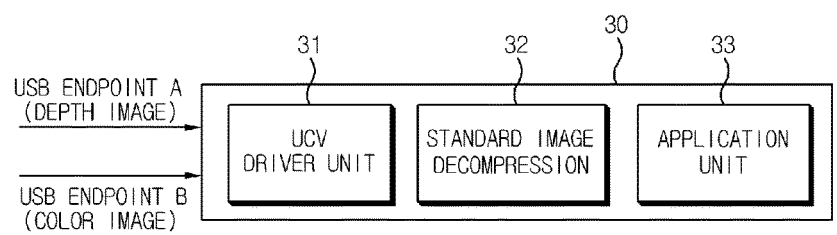
FIG. 5 is a detailed configurative block diagram illustrating a host system of FIG. 2 according to an exemplary embodiment of the present invention.

FIG. 5 is a detailed configurative block diagram illustrating a host system of FIG. 2 according to an exemplary embodiment of the present invention, where only constituent parts related to processing of image data transmitted by the image data transmitting apparatus (1) according to an exemplary embodiment of the present invention are described, such that understanding of the host system (30) configured only with the constituent parts illustrated in FIG. 5 should be avoided.

Referring to FIG. 5, the host system (30) receiving image data from the image data transmitting apparatus (1) according to an exemplary embodiment of the present invention comprises a UCV driver unit (31), a standard image decompression unit (32) and an application unit (33), which are mounted as defaults in a conventional host systems (e.g., notebook computers, TVs, tablet computers, mobile terminals).

The host system (30) receives two types of image data (depth image and color image) from the USB interface unit (20) via a receiver (not shown), whereby it is possible to recognize images received from the UVC driver unit (31) as being the images received from two video devices. This can be enabled by use of two endpoints by the USB interface unit (20) according to an exemplary embodiment of the present invention.

The standard image decompression unit (32) decompresses the image data compressed by the standard image compression unit (22) of the USB interface unit (20). It should be apparent that the decompression using the compression method used by the standard image compression unit (22) of the USB interface unit (20) is well known to the skilled in the art.

The application unit (33) may be, for example, an API, and provides application for use by a user using the image data, whereby the user can selectively use one or two images as necessary.

As apparent from the foregoing, the image data transmitting apparatus according to an exemplary embodiment of the present invention is advantageous in that data transmission efficiency can be enhanced by the standard image compression unit using the standard protocol such as JPEG or H.264, and limitation of bandwidth using the USB type can be overcome.

Furthermore, the image data transmitting apparatus according to an exemplary embodiment of the present invention is advantageous in that two endpoints of the USB interface unit (20) are used to transmit two images (depth image and color image) to the host system through each endpoint, whereby there is no need of requiring separate encoding and decoding processes.

Furthermore, the image data transmitting apparatus according to an exemplary embodiment of the present invention is advantageous in that an image data is transmitted using the standard UVC to dispense with a separate driver unit in the host system, and an image signal is processed in response to API relative to the UVC, whereby additional API is not required to simplify the system. Thus, the host system can easily use a camera from installation of additional software.

Meanwhile, the exemplary embodiments of the present disclosure may be embodied in the form of program code embodied in tangible media, such as magnetic recording media, optical recording media, solid state memory, floppy diskettes, CD-ROMs, hard drives, or any other non-transitory machine-readable storage medium. When the exemplary embodiments of the present disclosure are implemented using software, constituent means of the present disclosure may be code segments executing necessary processes. The programs or code segments may be also embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the disclosure.

The above-described embodiments of the present invention can also be embodied as computer readable codes/instructions/programs on a computer readable recording medium. Examples of the computer readable recording medium include storage media, such as magnetic storage media (for example, ROMs, floppy disks, hard disks, magnetic tapes, etc.), optical reading media (for example, CD-ROMs, DVDs, etc.), carrier waves (for example, transmission through the Internet) and the like. The computer readable recording medium can also be distributed over network coupled computer systems so that the computer readable code is stored and executed in a distributed fashion.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The image data transmitting apparatus according to exemplary embodiment of the present invention has an industrial applicability in that a standard protocol such as JPEG or H.264 is used to perform a standard image compression to increase transmission efficiency and to overcome a bandwidth limitation of USB method, two endpoints of USB interface unit are used to transmit two images (depth image and color image) to a host system via each endpoint, whereby separate encoding and decoding are not required to simplify the system, a standard UVC is used to transmit image data, whereby the host system needs no separate device driver, and the host system processes the image data in response to API relative to the UVC, whereby additional API is not required to simplify the system, and a camera can be easily used free from installation of additional software.

The invention claimed is:

1. An image data transmission apparatus, the apparatus comprising:

a compression unit performing compression on the depth image data and the color image data in real time using a predetermined standard protocol;

a conversion unit converting the compressed depth image data and the color image data to Universal Serial Bus (USB) packet data respectively; and a transmission unit transmitting the converted depth image data and the color image data to a host system via USB;

an image processor outputting the depth image data and the color image data from a right image and left image in a stereo type;

wherein the image processor comprises a stereo matching unit determining an image distance by receiving the right image and the left image, and a line buffer outputting the color image data from the right image and the left image, and outputting the depth image data from an output of the stereo matching unit.

2. The apparatus of claim 1, wherein the standard protocol used by the compression unit is JPEG or H.242.

3. The apparatus of claim 1, wherein the host system decompresses received depth image data and the color image data, using the standard protocol used by the compression unit.

4. The apparatus of claim 1, wherein the transmission unit transmits the converted depth image data and the color image data by allocating to mutually different endpoints.

5. The apparatus of claim 1, wherein the host system selectively or simultaneously uses the received depth image data and the color image data.

6. The apparatus of claim 1, wherein the transmission unit transmits the depth image data and the color image data using a universal transport protocol.

7. The apparatus of claim 6, wherein the universal transport protocol includes a UVC (Universal Video Class).

8. The apparatus of claim 7, wherein the host system further comprises a UVC driver.

9. An image data transmission apparatus, the apparatus comprising:

an image processor determining a depth image data and a color image data using the right image and the left image;

a Universal Serial Bus (USB) interface unit compressing the depth image data and the color image data in real time using a standard protocol and transmitting the compressed depth image data and the color image data respectively to a host system via USB;

wherein the USB interface unit comprises a compression unit performing compression on the depth image data and the color image data in real time using a standard protocol;

a conversion unit converting the compressed depth image data and the color image data to USB packet data respectively; and a transmission unit transmitting the converted depth image data and the color image data.

10. The apparatus of claim 9, wherein the transmission unit transmits the converted depth image data and the color image data by allocating to mutually different endpoints.

11. The apparatus of claim 9, wherein the transmission unit transmits the depth image data and the color image data using a universal transport protocol.

12. The apparatus of claim 11, wherein the universal transport protocol includes a UVC.

* * * * *